United States Patent Office 2,755,267
Patented July 17, 1956

2,755,267

POLYMERIC CHLOROTRIFLUOROETHYLENE

Robert W. Finholt, Erie, Pa., assignor to General Electric Company, a corporation of New York No Drawing. Application March 9, 1953,
Serial No. 341,373

6 Claims. (Cl. 260—33.2)

This invention is concerned with solid polymeric chlorotrifluoroethylene of improved plasticity and stability. More particularly the invention relates to a composition of matter comprising (1) solid polymeric chlorotrifluoroethylene and (2) a chlorinated diphenyl ether containing at least three chlorine atoms nuclearly disposed on the phenyl nuclei of the ether.

Polymeric chlorotrifluoroethylene has been found to have good resistance and chemical resistance and because of this is eminently suitable for many applications where such properties are desired. Electrical conductors insulated with polymeric chlorotrifluoroethylene are capable of withstanding temperatures of the order of from about 150° to 200° C. for long periods of time with little change in the physical characteristics or the insulating properties of the polymeric insulation. Such polymeric material is also highly desirable for many applications where a high softening point is an advantage. Thus, it it possible to mold various objects from the polymeric chlorotrifluoroethylene either with or without fillers to give useful articles which are dimensionally stable over a wide temperature range.

Because of its extreme chemical resistance and substantial insolubility in many of the common organic solvents, great difficulty has been experienced in obtaining the polymeric chlorotrifluoroethylene in usable form whereby it can be employed for molding or other applications. In the past, relatively high molding temperatures and pressures have been necessary in order to effectively extrude the polymeric chlorotrifluoroethylene. In addition, it has been found at elevated temperatures the polymeric chlorotrifluoroethylene tends to degrade and because of this, the use of the polymeric chlorotrifluoroethylene in various applications at elevated temperatures, particularly at temperatures above 175° to 200° C., has been materially curtailed.

I have now discovered that I am able to improve the moldability and extrudability of polymeric chlorotrifluoroethylene (any solid polymer thereof may be employed) while at the same time improving the stability of the polymeric chlorotrifluoroethylene at elevated temperatures. The above results are attained by incorporating in the polymeric chlorotrifluoroethylene varying amounts of chlorinated diphenyl ethers in which the phenyl nuclei of the diphenyl ether are substituted with at least three and as high as nine or more chlorine atoms. The chlorinated diphenyl ethers employed in the practice of this invention may be considered as corresponding to the general formula

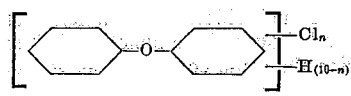

where $n$ is a whole number equal to from 3 to 10; e. g., pentachlorodiphenyl ether, hexachlorodiphenyl ether, octachlorodiphenyl ether, etc. Mixtures of these chlorinated diphenyl ethers may be employed within the scope of my invention wherein the average number of chlorines on the phenyl nuclei is equal to at least three. Thus, one may employ mixtures of chlorinated diphenyl ethers in which a predominant effective proportion (e. g., at least 25 to 50%) of the chlorinated diphenyl ethers contain at least three chlorine atoms on the phenyl nuclei, there being present in the mixture, if desired, other chlorinated diphenyl ethers containing, e. g., less than three or more than the nuclearly-substituted chlorine atoms. In such mixtures, the prime requisite is that there be sufficient chlorinated diphenyl ether containing at least three chlorine atoms on the phenyl nucleus or nuclei of the ether to exert the desired effects of plasticity and workability at lower temperatures.

The manner whereby the chlorinated diphenyl ethers (for brevity hereinafter so designated) may be incorporated in the polymeric chlorotrifluoroethylene may be varied widely. One method comprises mechanically mixing finely divided polymeric chlorotrifluoroethylene with the chlorinated diphenyl ether. This may be accomplished by mixing together finely divided polymeric chlorotrifluoroethylene with the chlorinated diphenyl ether, and heating the mixture to a temperature of about 150° to 200° C. and thereafter subjecting the heated mixture to vigorous stirring so as to intimately disperse the chlorinated diphenyl ether in the polymeric material. In this manner one may obtain molding powders suitable for various molding applications including extruding applications. A slurry may also be formed of finely divided polymeric chlorotrifluoroethylene and the chlorinated diphenyl ether dissolved in benzene together with an additional amount of benzene, and thereafter effecting homogenization of the mixture by suitable well-known means. Thereafter, the benzene may be removed by heating the mixture to give an intimately dispersed mixture of the polymer and the chlorinated diphenyl ether.

The amount of chlorinated diphenyl ether which may be added for plasticization and stabilization purposes may be varied within wide limits. Preferably, I employ from about 5 to 20% of the chlorinated diphenyl ether based on the weight of the polymeric chlorotrifluoroethylene.

The polymeric chlorotrifluoroethylene may be any one of those usually available on the market. Generally, the polymeric material is employed in the finely divided state, and for coating purposes (e. g., in formation of slurries) is of an average particle size of the order of from about 0.2 to 25 microns, preferably from 0.5 to 15 microns average diameter. Attainment of the finely divided state may be accomplished by grinding the polymer in a micropulverizer used for such purposes. Thereafter, the polymeric chlorotrifluoroethylene together with the chlorinated diphenyl ether may be mixed in whatever fashion desired, and may even be ball-milled or ground in a pebble mill to effect satisfactory dispersion of the chlorinated diphenyl ether in the polychlorotrifluoroethylene. For extrusion purposes, polymeric chlorotrifluoroethylene of much larger average diameter may be used, e. g., pellets, etc., may be advantageously employed.

In order that those skilled in the art may better understand how the present invention may be practiced, the following examples are given by way of illustration and not by way of limitation. All parts are by weight.

EXAMPLE 1

In this example, a commercially available chlorinated diphenyl ether (sold by Dow Chemical Company, of Midland, Michigan under the name of Dow 5x) containing an average of 5 chlorine atoms on the phenyl nuclei (essentially all the chlorinated diphenyl ether comprised the pentachloro-substituted composition), was employed with solid polymeric chlorotrifluoroethylene (Kel-F resin manufactured by the M. W. Kellogg Company, Jersey City, New Jersey) and the mixture of ingredients molded in accordance with the procedure described below. The polymeric chlorotrifluoroethylene employed comprised one having a no strength temperature (N. S. T.) of 240° C. The N. S. T. value serves as a useful guide in the molding of plastics and has particular applicability to plastics composed essentially of polymeric chlorotrifluoroethylene. The measurement of the N. S. T. value is more particularly described in U. S. Patent 2,617,152, issued November 11, 1952.

Ten percent, by weight, of the above-described liquid chlorinated diphenyl ether, based on the weight of the polymer, was mixed with finely divided polymeric chlorotrifluoroethylene having a N. S. T. value of 240° C., and the mixture of the two ingredients was passed repeatedly through a small rubber mill for about five minutes. This formulation was then pressed into sheets using a Carver press employing a platen temperature of about 250° C., a pressure of about 10,000 p. s. i., and a pressing time of about 30 seconds followed by a water quench. Each of the molded sheets was permitted to age at 25° C. and small strips, 1½" x ¼", were cut off periodically for flex testing. The number of flexes (which comprised creasing the strip by folding it back on itself and then reversing 360°) required to break the modified samples in two as well as control samples from which the chlorinated diphenyl ether was omitted, are disclosed in the following Table I.

Table I

| Days | 28 | 35 | 65 |
|---|---|---|---|
| | Flexes | Flexes | Flexes |
| Control-Polychlorotrifluoroethylene N. S. T. 240° C. (no chlorinated diphenyl ether) | 46 | 32 | 53 |
| Polychlorotrifluoroethylene+10% Dow 5x | 81 | 95 | 78 |

EXAMPLE 2

In this example, a mixture of solid polymeric chlorotrifluoroethylene (N. S. T. 240° C.) and 5%, by weight, Dow 5x, was extruded over nickel-plated copper wire using a small extruding machine having an overall barrel length of 10", a worm diameter of 1" (the worm being a double shallow thread of continuous pitch), having a self-centering die, and having a small capacity head. The barrel was heated electrically by means of two heating units embedded in an aluminum core surrounding the barrel. The speed of the worm and the speed of the wire capstan could be varied through wide limits. The wire employed in the extrusion was nickel-plated 0.032" solid copper and was preheated before entering the head by an electric furnace. A wire temperature of 100° C. was maintained when operating at approximately 11 feet per minute. A cooling bath using circulating water was located 3" from the die. In the particular run described, the polymer containing 5%, by weight, pentachlorodiphenyl ether was extruded in such a manner that the front barrel temperature was about 225° C. while the rear barrel temperature was about 210° C. In addition, the die temperature was about 320° C. and the wire speed was about 10 feet per minute. The insulation produced in this run was clear, colorless and smooth, and passed the N. S. T. test described in "Tentative Inspection Procedure for F–1113 Coated Hook-up Wire," July 16, 1951, Squire Signal Corps Laboratories. This wire after heat-aging at 150° C. for three weeks could be bent around its own diameter without evidence of any cracking of the insulation.

Similar extrusions were conducted in the same manner as described in Example 2 above with the exception that instead of using pentachlorodiphenyl ether, there were employed diphenyl ether, pentachlorodiphenyl, diphenyl ether containing two chlorine atoms on the phenyl nuclei (Dow 2x), and diphenyl ether containing an average of nine chlorine atoms on the phenyl nuclei (Dow 9x). The conductor insulated with the diphenyl ether was of poor appearance, as evidenced by the fact that it was rough and bubbly, and was therefore not tested further. The wires insulated with the polymer containing the pentachlorodiphenyl and the Dow 2x were smooth, but it was found difficult to control the extrusion, and only short lengths of acceptable wire were obtained in each case. Even with the best appearing wire obtained under such circumstances, heat-aging of these wires at 150° C. and 175° C. for 48 hours, followed by a bend around their own diameters resulted in cracking and discoloration of the coatings. In contrast to these results, the extruded wire containing an insulation the polymeric chlorotrifluoroethylene having incorporated therein the diphenyl ether containing an average of nine chlorine atoms substituted on the phenyl nuclei was easy to handle and gave a wire of very good appearance. After 48 hours heat aging at 150° C., the coating was not cracked when bent on its own diameter; heat-aging for 48 hours at 175° C. caused slight discoloration of the insulation at the nickel interface, but the coating again was not cracked.

EXAMPLE 3

In this example, finely divided polymeric chlorotrifluoroethylene (N. S. T. 240° C.) was mixed with a benzene solution of about 5%, by weight, pentachlorodiphenyl ether (based on the weight of the polymeric chlorotrifluoroethylene) to form slurry. Thereafter, the benzene was removed to give an intimate dispersion of the polymeric chlorotrifluoroethylene and the pentachlorodiphenyl ether. Thereafter this mixture, as well as a control from which the chlorinated diphenyl ether was omitted, was extruded over nickel-plated copper wire of the same type described above in Example 2 employing the identical apparatus more particularly described in the latter example. The following Table II shows the conditions under which the modified and unmodified polymers were extruded. Under the heading "Resin Time," the subheading "Start" means the time required before the resin began to appear at the exit end of the extruding apparatus, while the subheading "End" means the time required for the entire resin charge to pass through the extruding apparatus.

Table II

| | Resin Evaluation | | | | |
|---|---|---|---|---|---|
| | Barrel Temp., ° C. | | Resin Temp.,* ° C. | Resin Time, Min. | |
| | Front | Rear | | Start | End |
| Polychlorotrifluoroethylene | 207 | 198 | 210 | 2.5 | 7.5 |
| Polychlorotrifluoroethylene plus 5% pentachlorodiphenyl ether | 207 | 198 | 210 | 1.75 | 4.75 |

* Inside the barrel.

It will be noted from an examination of Table II that polychlorotrifluoroethylene containing chlorinated diphenyl ether can be more readily extruded than can the unmodified polymer. It was also noted that the presence of the chlorinated diphenyl ether had no deleterious effect on the extruded polymer.

EXAMPLE 4

In this example, mixtures of solid polymeric chlorotrifluoroethylene and chlorinated diphenyl ether (Dow 5x) were extruded over nickel-plated 0.032" solid copper wire employing the same equipment as was described in Example 2 with the exception that the wire head and die were attached to the barrel. The wire was preheated before entering the head by an electric furnace. A wire temperature of 100° C. was attained at approximately 11 feet per minute. A cooling bath using circulating water was located 3" from the die while a worm speed of 8 revolutions per minute was used throughout the extrusion. The polymeric chlorotrifluoroethylene employed was finely divided material. The following Table III shows the results of extruding both the modified and unmodified polymeric chlorotrifluoroethylene over the nickel-plated copper wire, including the conditions of extrusion, and the properties of the extruded surface before and after heat-aging at 175° C. for varying lengths of time. The method of adding the chlorinated diphenyl ether was varied. In the case of sample No. 2, the chlorinated diphenyl ether was added to the powdered polymeric chlorotrifluoroethylene at around 120° C., the mixture pressed into small disks and thereafter crushed to a finely divided state. The extrusion compounds employed in sample Nos. 3, 4 and 6 were prepared by first heating the chlorinated diphenyl ether to about 150° C. and adding the heated liquid to pellets of pressed polymeric chlorotrifluoroethylene, and the entire mixture intimately stirred until a satisfactory dispersion of the chlorinated diphenyl ether in the polymeric chlorotrifluoroethylene had been attained. The unmodified as well as the mixtures of the polymeric chlorotrifluoroethylene and the chlorinated diphenyl ether were then charged to the extrusion apparatus.

in tests conducted on sample Numbers 3, 5, and 6, described in Table III above showed an average of from about 232 to about 239. The specifications for polymeric chlorotrifluoroethylene on wire require a minimum no strength temperature of 232° C. indicating that all the above-cited materials passed the minimum specifications.

The extruded and insulated wire shown in sample 3 described in Table III above was aged at 150° C. for periods of 4 and 7 days. At the end of the four day period, when the wire was given a bend around its own diameter, no crazing developed and the nickel surface appeared to be in good condition. After 7 days at 150° C., only slight crazing developed on a 1 diameter bend, but the adhesion of the insulation to the nickel substrate was still good.

It will, of course, be apparent to those skilled in the art in addition to the specific polymeric chlorotrifluoroethylene employed in the foregoing examples, other types of solid polymeric chlorotrifluoroethylene may be used without departing from the scope of the invention. In the same manner, one may use other chlorinated diphenyl ethers as, for instance, chlorinated diphenyl ethers containing an average of from at least 3

*Table III*

| Sample No. | Polymer | Barrel Temp., ° C. | | Die Temp., ° C. | Condition as made | Hours Aged, Hrs. at 175° C. | Condition after aging |
|---|---|---|---|---|---|---|---|
| | | Front | Rear | | | | |
| 1 a | 240 N. S. T. | 260 | 240 | 270 | Extremely rough coated only part of wire. | None | |
| 2 b | 240 N. S. T.+15% Dow 5x. | 200 | 200 | 240 | Smooth | 64 | Smooth, Unchanged. |
| 3 a | 240 N. S. T.+5% Dow 5x. | 225 | 210 | 320 | Very smooth | 24 | Do. |
| 4 a | 240 N. S. T.+5% Dow 5x. | 250 | 205 | 250-300 | Smooth | 16 | Do. |
| 5 b | 300 N. S. T. | 250 | 240 | 300 | Rough | 16 | Cracked. |
| 6 b | 300 N. S. T.+5% Dow 5x. | 260 | 240 | 300 | Smooth | 16 | Smooth, Unchanged. |

The sample numbers having the superscript "a" were prepared at a wire speed of 10 ft./min. while the sample number having the superscript "b" were prepared at a wire speed of 6 ft./min. In conducting the tests shown in Table III above, it was noted that when the unmodified resin was run at temperatures suitable to give a smooth coating, the insulation cracked after a short heat aging at 175° C. The presence of the chlorinated diphenyl ether permitted lower operating, i. e., extrusion, temperatures while at the same time giving good-heat aging characteristics.

The wires extruded in sample Numbers 3, 5 and 6 were tested for the no strength temperature of the polymer on the wire according to the modified test described in "Tentative Inspection Procedure for F–1113 Coated Hook-Up Wire," July 16, 1951, Squire Signal Corps Laboratories, U. S. A. This test is a modification of the N. S. T. test described in Kel-F Technical Bulletin #2–1–49 issued by the Kellogg Company of New York, New York. In accordance with this test, a 2" tubular piece of the insulation which has been stripped from the conductor is suspended in an electrically heated oven and a weight, determined from the following formula, is suspended from the bottom of the piece of insulation.

$$\text{Weight} = \frac{(\text{cross section of insulation in inches}^2)}{0.003}$$

0.25 gms. This value is 152 milligrams for the wire produced here based, namely, on a 25.8 mil build on a 31.8 mil wire. The assembly is hung in an over (which comprises an electrically heated 5 x 3 inch brass cylinder with a ¾" hole) and when the oven reaches 210° C., it is raised 1.5° C. per minute until the sample falls apart. From these tests it was found that the no strength temperatures of the polymers extruded over the conductor and up to 10 chlorine atoms nuclearly disposed on the phenyl radicals. Preferably, the number of chlorines advantageously ranges from about 3 to 9 chlorine atoms on the diphenyl ether residue. The disposition of the chlorines around the two phenyl nuclei may be varied; thus the chlorines may all be on one phenyl radical, or they may be symmetrically or unsymmetrically oriented around the two phenyl nuclei. Obviously, the proportions of the polymeric chlorotrifluoroethylene and the chlorinated diphenyl ether may be varied within the limits described previously.

The modified polymeric chlorotrifluoroethylene herein described and claimed may be employed in various applications. Thus, the modified polymeric material may be used in molding applications whereby advantage may be taken of the improved heat resistance and plasticity of the molded product. These molded compositions may be used as gaskets, as encapsulating materials for electrical coils and other electrical devices, etc. One of the main uses of the compositions herein described is for insulating electrical conductors in the manner described in the foregoing examples. Electrical conductors insulated with the polymeric chlorotrifluoroethylene modified with varying amounts of the chlorinated diphenyl ether have good heat resistance and electrical properties. The presence of the chlorinated diphenyl ether permits relatively rapid extrusion at temperatures below those normally required to effect satisfactory extrusion of the unmodified polymeric chlorotrifluoroethylene.

What I claim as new and desire to secure by Letters Patent of the United States is:

1. A solid composition of matter comprising (1) solid polychlorotrifluoroethylene and (2) from 5 to 20%, by weight, based on the weight of (1) of a chlorinated diphenyl ether containing an average of from 5 to 9 chlorine atoms substituted on the phenyl nuclei of the aforesaid ether intimately incorporated throughout the polychlorotrifluoroethylene.

2. A solid composition of matter comprising (1) solid polychlorotrifluoroethylene and (2) from 5 to 20%, by weight, based on the weight of (1), of pentachlorodiphenyl ether intimately incorporated throughout the polychlorotrifluoroethylene.

3. A solid composition of matter comprising (1) solid polychlorotrifluoroethylene and (2) from 5 to 20%, by weight, based on the weight of (1), of nonachlorodiphenyl ether intimately incorporated throughout the polychlorotrifluoroethylene.

4. The process for improving the workability at low temperatures and the plasticity of polychlorotrifluoroethylene, which process comprises intimately incorporating in the latter from 5 to 20%, by weight, based on the weight of the polychlorotrifluoroethylene, of a chlorinated diphenyl ether containing from 5 to 9 chlorine atoms substituted on the phenyl nuclei, and thereafter molding the mixture of ingredients.

5. The process for improving the workability at low temperatures and the plasticity of polychlorotrifluoroethylene, which process comprises intimately incorporating from 5 to 20%, by weight, based on the weight of the polychlorotrifluoroethylene, of pentachlorodiphenyl ether, and thereafter molding the aforesaid modified polychlorotrifluoroethylene.

6. The process for improving the workability at low temperatures and the plasticity of polychlorotrifluoroethylene, which process comprises intimately incorporating from 5 to 20%, by weight, based on the weight of the polymeric chlorotrifluoroethylene, of nonachlorodiphenyl ether, and thereafter molding the latter modified polychlorotrifluoroethylene.

References Cited in the file of this patent

UNITED STATES PATENTS 2,542,072    Sprung    Feb. 20, 1951